(12) United States Patent
Lusardi

(10) Patent No.: US 11,536,191 B2
(45) Date of Patent: Dec. 27, 2022

(54) ENGINE AND FUEL CELL SYSTEM INCLUDING FIRST AND SECOND TURBOCHARGERS

(71) Applicant: Caterpillar Inc., Peoria, IL (US)

(72) Inventor: Christopher Lusardi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/333,769

(22) Filed: May 28, 2021

(65) Prior Publication Data

US 2021/0285364 A1 Sep. 16, 2021

Related U.S. Application Data

(62) Division of application No. 16/405,600, filed on May 7, 2019, now Pat. No. 11,022,028.

(51) Int. Cl.
| | |
|---|---|
| *F02B 37/00* | (2006.01) |
| *F02M 26/08* | (2016.01) |
| *H01M 8/04111* | (2016.01) |
| *F02B 37/24* | (2006.01) |
| *F02B 37/013* | (2006.01) |

(Continued)

(52) U.S. Cl.
CPC .............. *F02B 37/001* (2013.01); *F01D 5/14* (2013.01); *F02B 37/013* (2013.01); *F02B 37/24* (2013.01); *F02M 26/08* (2016.02); *F04D 29/2216* (2013.01); *H01M 8/04111* (2013.01);

(Continued)

(58) Field of Classification Search
CPC . H01M 8/04111; F02B 37/001; F02B 37/002; F02B 37/004; F02B 37/007; F02B 37/013; Y02E 60/50; Y02T 90/40
See application file for complete search history.

(56) References Cited

U.S. PATENT DOCUMENTS

| | | | |
|---|---|---|---|
| 2,780,053 A | 2/1957 | Cowland | |
| 3,626,694 A | 12/1971 | Holste | |

(Continued)

FOREIGN PATENT DOCUMENTS

| | | | | |
|---|---|---|---|---|
| CN | 102324538 A | * | 1/2012 | |
| CN | 106703918 A | * | 5/2017 | ........... F01K 25/103 |

(Continued)

OTHER PUBLICATIONS

Turbocharger Specs—Garret GT 20 GT2052 Published Apr. 2012 (Year: 2012).

*Primary Examiner* — Laert Dounis

(74) *Attorney, Agent, or Firm* — Bookoff McAndrews, PLLC

(57) ABSTRACT

An engine system includes an internal combustion engine, a fuel cell system, a first turbocharger and a second turbocharger. The internal combustion engine has an intake passage, and a first exhaust passage fluidly connected to the first set of combustion chambers. The first turbocharger has a first compressor and a first turbine. The second turbocharger has a second compressor and a second turbine, the second compressor connected in series with the first compressor, and the second turbine being in fluid communication with the second exhaust passage. The first and second turbines are connected in parallel such that the first turbine only receives exhaust flow from the fuel cell system, and the second turbine only receives exhaust flow from the internal combustion engine.

20 Claims, 4 Drawing Sheets

(51) Int. Cl.
*F04D 29/22* (2006.01)
*F01D 5/14* (2006.01)
*H01M 8/12* (2016.01)

(52) U.S. Cl.
CPC .............. *H01M 2008/1293* (2013.01); *H01M 2250/20* (2013.01); *Y02E 60/50* (2013.01); *Y02T 90/40* (2013.01)

(56) References Cited

U.S. PATENT DOCUMENTS

| | | | |
|---|---|---|---|
| 6,230,494 B1 * | 5/2001 | Botti | F02B 1/12 |
| | | | 60/737 |
| 6,321,537 B1 | 11/2001 | Coleman et al. | |
| 7,165,403 B2 | 1/2007 | Sun et al. | |
| 7,846,602 B2 * | 12/2010 | Kamachi | H01M 8/04111 |
| | | | 429/479 |
| 8,297,053 B2 | 10/2012 | Gladden et al. | |
| 8,857,176 B2 | 10/2014 | Takahashi et al. | |
| 8,943,823 B2 | 2/2015 | Fiveland | |
| 10,107,180 B2 | 10/2018 | Kemmerling et al. | |
| 2006/0059908 A1 | 3/2006 | Schorn et al. | |
| 2006/0101819 A1 | 5/2006 | Schorn et al. | |
| 2006/0127720 A1 * | 6/2006 | Ferrall | H01M 8/0662 |
| | | | 429/442 |
| 2006/0174621 A1 | 8/2006 | Chen et al. | |
| 2007/0099057 A1 * | 5/2007 | Ferrall | H01M 8/1246 |
| | | | 429/465 |
| 2013/0031902 A1 | 2/2013 | Erdmenger et al. | |
| 2015/0285191 A1 * | 10/2015 | Kitada | F02B 37/18 |
| | | | 60/605.2 |
| 2016/0312687 A1 | 10/2016 | Kemmerling et al. | |
| 2018/0212261 A1 | 7/2018 | Manabe et al. | |
| 2020/0028190 A1 * | 1/2020 | Braun | H01M 8/0618 |

FOREIGN PATENT DOCUMENTS

| | | | | |
|---|---|---|---|---|
| CN | 108005742 A | * | 5/2018 | ............. F01K 13/00 |
| DE | 102007057224 A1 | * | 1/2009 | ............... B60K 6/26 |
| DE | 102016010350 A1 | | 3/2018 | |
| EP | 1028233 A2 | | 8/2000 | |
| JP | 05065830 A | | 3/1993 | |
| JP | H1162625 A | | 3/1999 | |
| JP | 2005276634 A | * | 10/2005 | |
| JP | 2006100223 A | * | 4/2006 | |
| WO | WO 2008/129652 A1 | | 10/2008 | |

* cited by examiner

US 11,536,191 B2

ENGINE AND FUEL CELL SYSTEM INCLUDING FIRST AND SECOND TURBOCHARGERS

CROSS-REFERENCE TO RELATED APPLICATION(S)

This patent application is a divisional of and claims the benefit of priority to U.S. Nonprovisional patent application Ser. No. 16/405,600, filed on May 7, 2019, the entirety of which is incorporated herein by reference.

STATEMENT OF GOVERNMENT INTEREST

This invention was made with government support under contract DE-AR0000953 / 850K474(Sub) awarded by the DOE. The Government has certain rights in this invention.

TECHNICAL FIELD

Various embodiments of the present disclosure relate generally to engine systems and, more particularly, to engine systems having first and second turbochargers.

BACKGROUND

Internal combustion engines are used in various stationary and mobile applications to generate power by the combustion of a fuel such as diesel fuel. Internal combustion engines in both stationary and mobile applications may employ one or more turbochargers to improve power and/or efficiency. Turbochargers may also be employed in hybrid engine systems, including engine systems which employ a fuel cell to produce electrical power via a chemical reaction. When a single turbocharger is provided in an engine system, the turbocharger may achieve some benefits, but may be less efficient than a system including a plurality of turbochargers. However, the use of plural (e.g., two) turbochargers may introduce other drawbacks. For example, when two turbochargers are connected to a single exhaust stream such as by a branched exhaust pipe, efficiency of the turbines of the engine system may suffer due to the division of the exhaust into two streams. Additionally, such systems may limit the ability to adjust an amount of exhaust gas recirculation (EGR), negatively affecting performance, efficiency, and/or emissions of the engine.

An exemplary system for an engine with a two-stage turbocharger is disclosed in U.S. Patent Application Publication No. 2013/0031902 A1 ("the '902 publication") to Erdmenger et al. The system disclosed in the'902 publication provides exhaust from two exhaust banks that are connected via a branched communication duct, resulting in interconnected exhaust streams. The system includes a valve such as a gate valve that allows or prohibits flow of exhaust gas to a first turbine. While the system disclosed in the '902 publication may be useful in some circumstances, the system may introduce disadvantages such as efficiency losses due to the interconnected exhaust streams. Further, the use of a valve upstream of the turbine may introduce additional efficiency losses.

The disclosed method and system may solve one or more of the problems set forth above and/or other problems in the art. The scope of the current disclosure, however, is defined by the attached claims, and not by the ability to solve any specific problem.

SUMMARY

In one aspect, an engine system may include an internal combustion engine having an intake passage, a first set of combustion chambers, a second set of combustion chambers, a first exhaust passage fluidly connected to the first set of combustion chambers, and a second exhaust passage fluidly connected to the second set of combustion chambers. The engine system may include a first turbocharger including a first compressor and a first turbine, the first compressor being in fluid communication with the intake passage, and the first turbine being in fluid communication with the first exhaust passage. The engine system may also include a second turbocharger including a second compressor and a second turbine, the second compressor connected in series with the first compressor, and the second turbine being in fluid communication with the second exhaust passage. The first and second turbines may be connected in parallel such that the first turbine only receives exhaust flow from the first set of combustion chambers, and the second turbine only receives exhaust flow from the second set of combustion chambers.

In another aspect, an engine system may include an internal combustion engine having an engine intake passage and a first exhaust passage, and a fuel cell system having a fuel cell air intake passage and a second exhaust passage. The engine system may include a first turbocharger including a first compressor and a first turbine, the first compressor being in fluid communication with the engine intake passage, and the first turbine being in fluid communication with the second exhaust passage, and a second turbocharger including a second compressor and a second turbine, the second compressor connected in series with the first compressor, and the second turbine being in fluid communication with the first exhaust passage. The first and second turbines may be connected in parallel such that the first turbine only receives exhaust flow from the fuel cell system, and the second turbine only receives exhaust flow from the internal combustion engine.

In yet another aspect, a method of operating an engine system may include compressing a flow of air in a first compressor of a first turbocharger and further compressing the flow of air in a second compressor of a second turbocharger, and combusting fuel in a first set of combustion chambers and in a second set of combustion chambers, the first and second sets of combustion chambers being in fluid communication with the first and second compressors. The method may include providing a flow of exhaust from the first set of combustion chambers only to a first exhaust passage and a flow of exhaust from the second set of combustion chambers only to a second exhaust passage, and expanding the flow of exhaust from the first exhaust passage in a first turbine of the first turbocharger and the flow of exhaust from the second exhaust passage in a second turbine of the second turbocharger.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
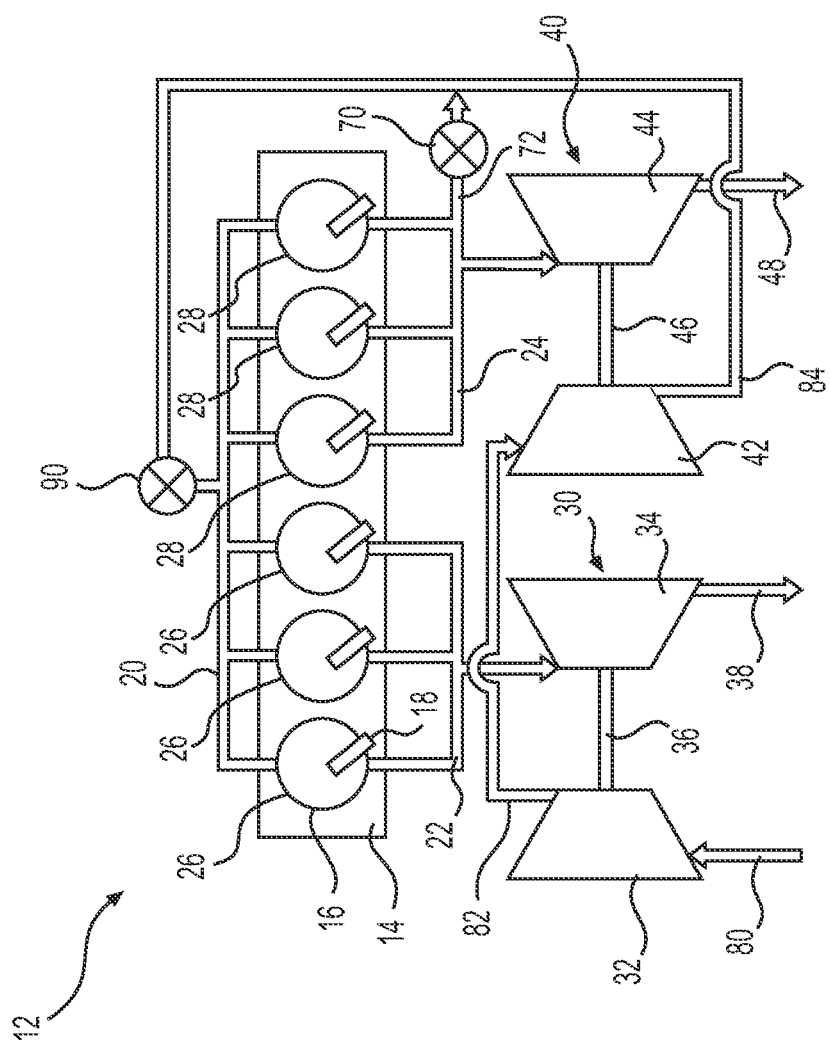
FIG. 1 is a schematic illustration of an engine system according to an aspect of the present disclosure.

FIG. 1 is a schematic view of an internal combustion engine system 12 which may include an engine 14, a pair of turbochargers 30, 40 in a parallel-series arrangement, and an exhaust gas recirculation (EGR) system including an EGR valve 70 and EGR passage 72. Engine system 12 may be a combustion system configured to operate by combusting one or more fuels including diesel, natural gas, methane, and/or propane in engine 14. While engine 14 may be configured as a single-fuel engine, engine 14 may instead be configured to operate on two different fuels (e.g., diesel and gaseous fuel).

Engine 14 may include a plurality of cylinders 16, within which one or more fuel injectors 18 may be provided for injecting a fuel into respective a combustion chambers defined by respective cylinders 16. The combustion chambers of cylinders 16 may form a first set of combustion chambers 26 and a second set of combustion chambers 28. In the configuration shown in FIG. 1, there may be three combustion chambers in each of the first and second sets 26, 28. While the number of combustion chambers in the first set 26 may be equal to the number of combustion chambers in the second set 28, it is also possible to provide first and second sets of combustion chambers 26, 28 that have different numbers of combustion chambers. For example, a number of combustion chambers in the second set 28 may be larger than a number of combustion chambers in the first set 26.

Engine system 12 may include an intake manifold or intake passage 20 for providing a flow of air to the combustion chamber of each cylinder 16. Engine system 12 may have a plurality of exhaust manifolds or exhaust passages 22, 24 that provide separate paths for combustion products or exhaust to exit the combustion chambers. In one aspect, engine 14 may include a pair of exhaust passages. The first exhaust passage 22 may be connected to the first set of cylinders 26 and to a first turbine 34 of first (low-pressure) turbocharger 30. Second exhaust passage 24 may be connected to the second set of cylinders 28 and to a second turbine 44 of second (high-pressure) turbocharger 40. Second exhaust passage 24 may also be connected to the EGR system formed by EGR valve 70 and EGR passage 72 to provide a supply of exhaust gas to intake passage 20. EGR passage 72 may branch from second exhaust passage 24 as shown in FIG. 1.

System 12 may include a series of passages that provide air to compressors 32, 42, and allow exhaust to exit from turbines 34, 44. An air intake passage 80 may be connected to first compressor 32 to provide uncompressed ambient air. An outlet of first compressor 32 may be connected to air passage 82, which may extend directly to an inlet of second compressor 42. An outlet of second compressor 42 may be connected to intake passage 20 via a high-pressure air passage 84, which is in fluid connection with second exhaust passage 24 via EGR valve 70 and EGR passage 72. Outlets of first and second turbines 34, 44 may be connected to respective outlet passages 38, 48, which may be connected to one or more aftertreatment devices (not shown) to reduce the level of undesired compounds from exhaust gases.

First turbocharger 30 and second turbocharger 40 may be provided in a parallel-series arrangement. For example, first and second turbochargers 30, 40 may include compressors 32, 42 which are connected in series, and turbines 34, 44 which are connected in parallel. Shafts 36, 46, may connect first compressor 32 to first turbocharger 34 and second compressor 42 to second turbocharger 44, respectively. First compressor 32 may receive air at atmospheric pressure from an air intake passage 80. First compressor 32 may be a centrifugal or radial compressor provided as a lower-pressure compressor of engine system 12. First compressor 32 may be connected to higher-pressure second compressor 42 by air passage 82. Second compressor 42, like first compressor 32, may be a centrifugal or radial compressor, and may be configured to receive and further compress air output from first compressor 32. First turbocharger 30 and second turbocharger 40 may have different sizes. For example, second compressor 42 may be smaller than first compressor 32. Similarly, second turbine 44 may be smaller than first turbine 34.

An outlet of compressor 42 may be connected to high-pressure air passage 84. High-pressure air passage 84 may extend to or include a throttle valve 90 for controlling an amount of high-pressure air that is provided into intake passage 20 of engine 14. A junction connecting high-pressure air passage 84 to EGR passage 72 may be provided at a position between intake passage 20 and second compressor 42.

As can be seen in FIG. 1, a path of exhaust to first turbine 34 may be separate and isolated from a path of exhaust to second turbine 44. Thus, first turbine 34 may only receive exhaust flow from first set of combustion chambers 26, and second turbine 44 only receives exhaust flow from the second set of combustion chambers 28. As used herein, the phrases "the first turbine only receives exhaust flow from the first set of combustion chambers" and "the second turbine only receives exhaust flow from the second set of combustion chambers" refers to exhaust passages that are separate and do not include a passage operable as a bridge for a flow of exhaust between the first and second exhaust passages. No exhaust passage connects first exhaust passage 22 and second exhaust passage 24. Second turbine 44 of turbocharger 40, which is connected to second exhaust passage 24, may be more restrictive as compared to first turbine 34 of first turbocharger 30. For example, second turbine 44 itself, or an inlet of second turbine 44, may be more restrictive than first turbine 34, or an inlet of first turbine 34. In one aspect, turbine 44 may be smaller than turbine 34, as noted above. Thus, a flow of gas (exhaust) through second turbine 44 may experience a higher amount of restriction as compared to a flow gas through first turbine 34. A pressure drop of exhaust gas between an inlet and an outlet of second turbine 44 may be higher as compared to a pressure drop of exhaust gas between an inlet and an outlet of first turbine 34. The higher pressure drop may provide sufficient back pressure within second exhaust passage 24 and EGR passage 72 to facilitate the operation of the EGR system.

In an exemplary configuration, first turbocharger 30 may be a fixed-geometry turbocharger, and second turbocharger 40 may include a variable-geometry turbocharger (VGT). When second turbocharger 40 is configured as a VGT, a control unit (not shown) may control a position of vanes of the VGT provided in turbine 44. The control unit may also control a position (degree of opening) of EGR valve 70. The VGT may allow control over an amount of restriction of second turbocharger 40, thus providing variable control of the pressure of the exhaust gas upstream of turbine 44. In some embodiments, this variable control may allow for the omission of EGR valve 70. According to another aspect of the present disclosure, first and second turbochargers 30, 40 may both be fixed-geometry turbochargers.

Figure 2:
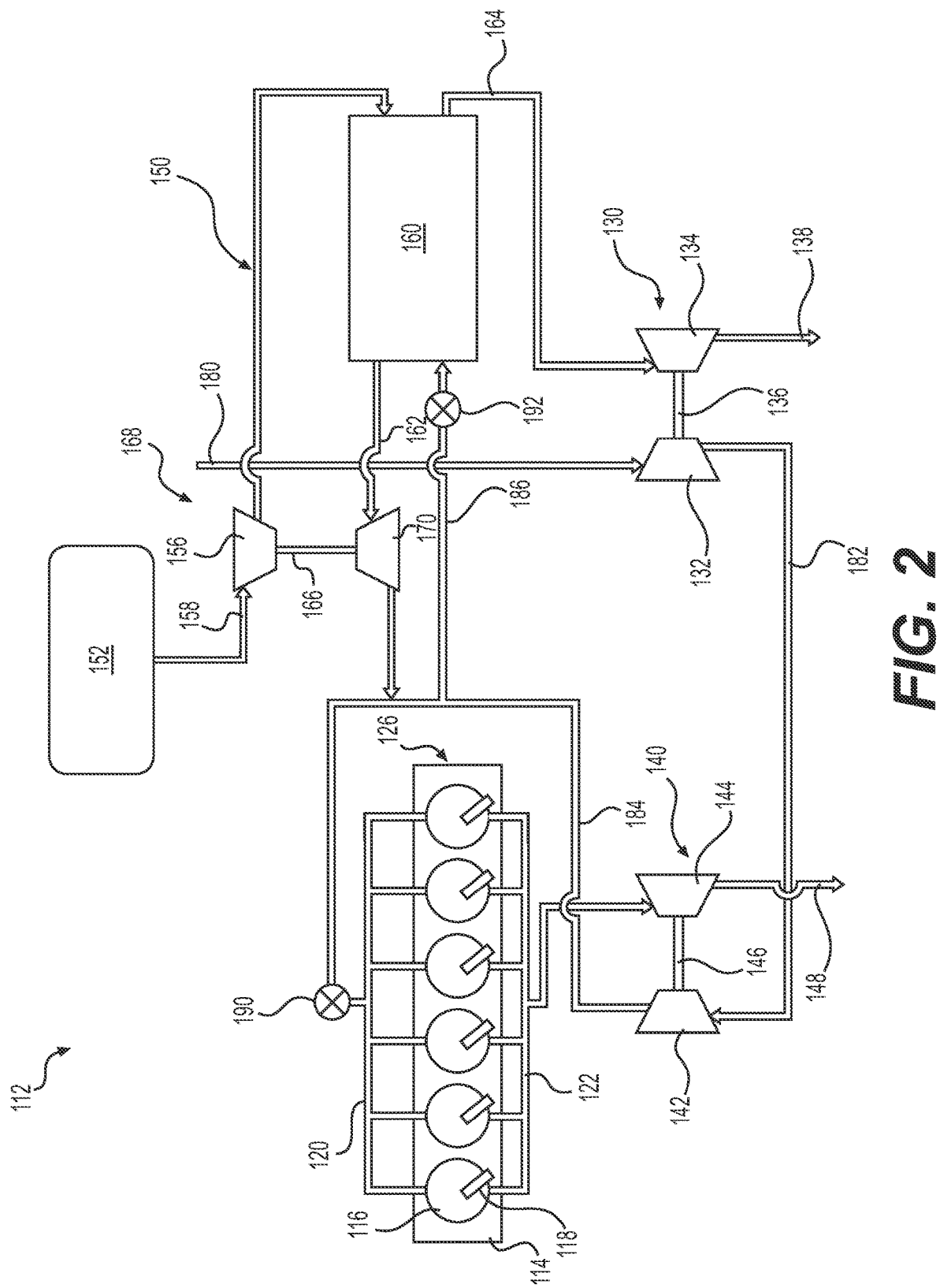
FIG. 2 is a schematic illustration of an engine system according to another aspect of the present disclosure.

FIG. 2 is a schematic view of an engine system 112 which may include an internal combustion engine 114, a first turbocharger 130, a second turbocharger 140, and a fuel cell system 150. Engine 114 may include a plurality of cylinders 116, one or more fuel injectors 118 for injecting fuel, and a set of combustion chambers 126 defined by cylinders 116. Engine 114 may also include an intake manifold or intake passage 120 and an exhaust manifold or first exhaust passage 122. In one aspect, engine system 112 may also include an exhaust gas recirculation system (not shown). Engine 114 may be any appropriate internal combustion engine system. In one aspect, engine 114 is configured to generate power via combustion of one or more of diesel, natural gas, and propane fuels.

Fuel cell system 150 may include a fuel source 152 and a solid oxide-type fuel cell 160, or any other appropriate type of fuel cell. In one aspect, fuel cell 160 is configured to produce electricity from inputs including air and a fuel (e.g., diesel, natural gas, propane, methane, hydrogen gas, etc.). Fuel cell system 150 may also include a fuel turbocharger 168 and passages 158, 162, and 164. Fuel turbocharger 168 may be included when a gaseous fuel is provided by fuel source 152 and may include a fuel compressor 156, a fuel exhaust turbine 170, and a shaft 166 connecting compressor 156 and turbine 170.

Fuel source 152 may be a source of natural gas or any appropriate fuel. Fuel cell 160 may be configured to generate electric power from a chemical reaction between the fuel and an oxidizer, such as air. When natural gas or another appropriate fuel is provided, reactions within the fuel cell may produce hydrogen ($H_2$) which is oxidized to generate electrons. Oxygen present in air introduced to fuel cell 160 may diffuse through an electrolyte membrane and react with hydrogen to produce water.

Fuel source 152 may be connected to fuel cell compressor 156 via a fuel source passage 158. Fuel cell compressor 156, provided downstream of fuel source 152, may be configured to compress a flow of gaseous fuel to increase the pressure of the gas that is input to fuel cell 160 after being compressed. Fuel cell compressor 156 may be driven by (rotatable with) a flow of exhaust through a turbine 170. Fuel inlet passage 158 may include a portion downstream of fuel compressor 156 that is connected to a fuel inlet of fuel cell 160.

Fuel may be received in a compressed, gaseous form via an inlet of fuel cell 160 connected to fuel inlet passage 158. A depleted fuel passage 162 may provide a path for pressurized fuel to exit fuel cell 160. Depleted fuel turbine 170 may receive a portion, or all, of the depleted fuel from fuel cell 160. An outlet of depleted fuel turbine 170 may be connected to high-pressure air passage 184 to allow the depleted fuel, which may be combustible, to join a flow of air delivered to the set of combustion chambers 126. One or more appropriate valves (not shown) may be included to control a proportion of depleted fuel that is provided to turbine 170. Turbine 170 may eliminate the need to drive compressor 156 with external power (e.g., from engine 114 or a motor) and provides the ability to control flow through an anode of fuel cell 160.

Engine 14 and fuel cell system 150 may each be operably connected to first turbocharger 130 and second turbocharger 140. Turbochargers 130, 140 may be provided in a parallel-series arrangement similar to turbochargers 30 and 40 (FIG. 1), and may sized differently, similar to turbochargers 30 and 40. As shown in FIG. 2, compressors 132, 142 of turbochargers 130, 140 may be connected in series, while turbines 134, 144 are connected in parallel. Shafts 136, 146, may connect first compressor 132 to first turbocharger 134 and second compressor 142 to second turbocharger 144, respectively. Air intake passage 180 may provide ambient air to lower-pressure first compressor 132, which outputs compressed air to high-pressure second compressor 142 via air passage 182. Second compressor 142 may further compress air from first compressor 132 and output air to high-pressure air passage 184. High-pressure air passage 184 may include a branched connection to a fuel cell air intake passage 186 of fuel cell system 150 that supplies a portion of the compressed air to fuel cell 160. In one aspect, an amount of air provided to fuel cell 160 may be controlled by a fuel cell inlet valve 192 provided in air intake passage 186. High-pressure air passage 184 may be connected to a throttle valve 190 for controlling an amount of high-pressure air that is provided into intake passage 120 of engine 114. The portion of air provided to fuel cell 160 may exit the fuel cell through second exhaust passage or exhaust outlet passage 164. In one aspect, passage 164 may provide a path for exhaust such as air. Alternatively, passage 164 may provide a path for other types of exhaust. For example, depleted fuel passage 162 and turbine 170 may be omitted. When these components are omitted, depleted fuel may exit via second exhaust passage 164, first turbine 134, and first turbine outlet passage 138 and compressed air may be allowed to exit fuel cell 160 from a separate passage (not shown).

As can be seen in FIG. 2, a path of exhaust to first turbine 134 may be separate and isolated from, a path of exhaust to second turbine 144. Thus, first turbine 134 may only receive exhaust flow from second exhaust passage 164 (exhaust flow from fuel cell system 150), which includes air or depleted fuel output by fuel cell 160. Second turbine 144 may only receive exhaust flow from first exhaust passage 122 (exhaust flow from engine 114), which may include combustion products from the combustion chambers 126 of engine 114. As used herein, the phrases "the first turbine only receives exhaust flow from the fuel cell system" and "the second turbine only receives exhaust flow from the fuel cell system" refers to exhaust passages that are separate and do not include a passage operable as a bridge for a flow of exhaust between the first and second exhaust passages. In an exemplary configuration, no exhaust passage connects first turbine 134 and second turbine 144. Thus, the flows of exhaust to turbines 134, 144 may be separate and have different temperatures and pressures. A first turbine outlet passage 138 may provide a path for air or depleted fuel gas to exit system 112. When outlet passage 138 contains depleted fuel gas, this fuel gas may be introduced to engine 114 for combustion. Second turbine outlet passage 148 may be connected to one or more aftertreatment devices to reduce the level of undesired compounds from exhaust gases.

Figure 3:
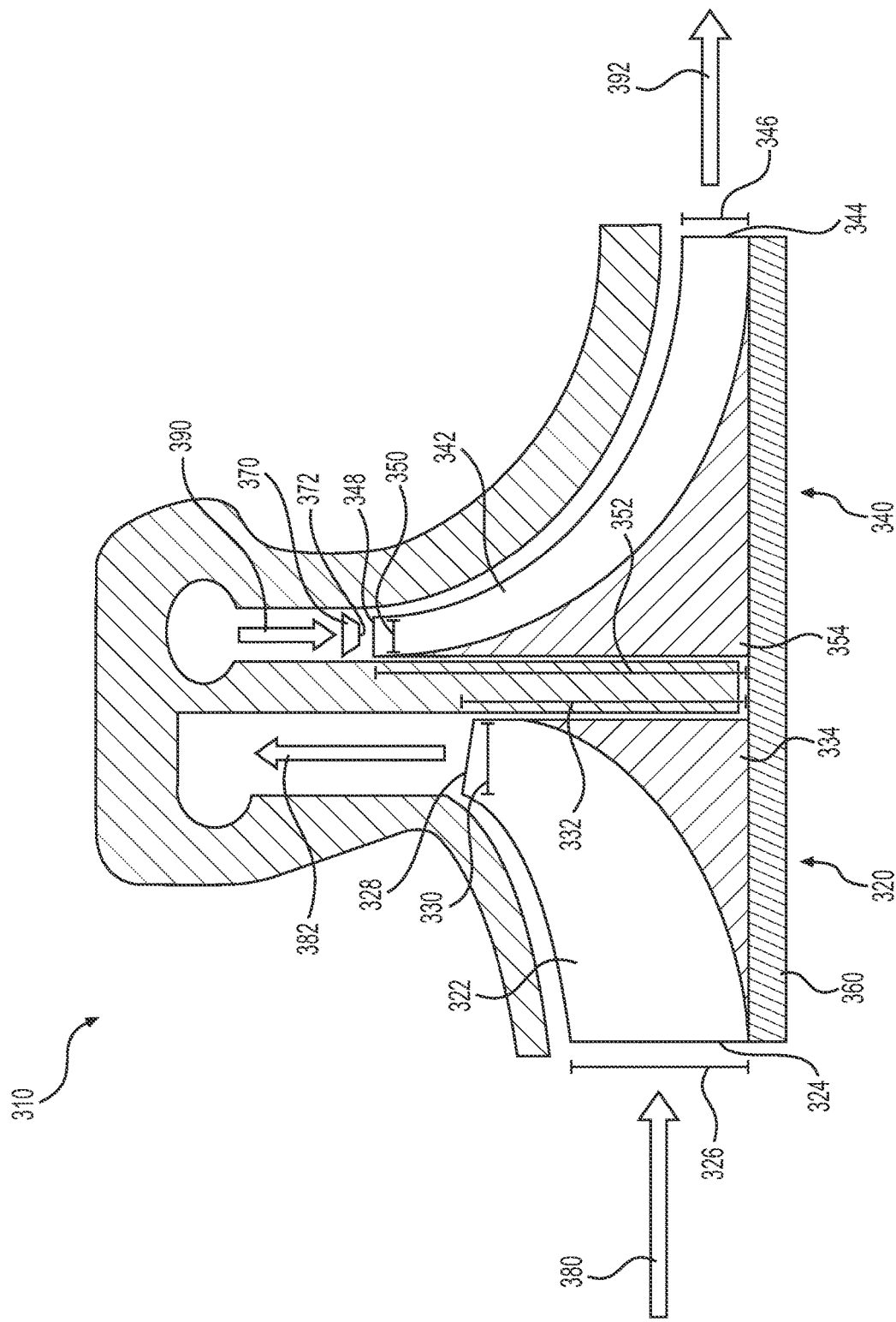
FIG. 3 is a schematic cross-sectional view of a turbocharger of the engine systems of FIGS. 1 and 2.

FIG. 3 is a schematic cross-sectional view of a turbocharger 310 that may be employed as one or more of turbochargers 30, 40, 130, 140. In an exemplary embodiment, each of turbochargers 30, 40, 130, 140 may be formed with the configuration shown in FIG. 3 and described herein with respect to turbocharger 310.

Turbocharger 310 may include a compressor 320, a turbine 340, and a shaft 360. Compressor 320 may include a plurality of compressor blades 322 supported on a centrally-disposed compressor hub 334. An inlet of compressor 320 may receive a flow of input air 380 and output a flow of compressed output air 382. Turbine 340 may include a plurality of turbine blades 342 supported on a turbine hub 354. Turbine 340 may receive a flow of input exhaust 390 and output a flow of expanded exhaust 392. Compressor blade 322 may include an axial tip end 324 formed at an inlet of compressor 320 and a radial tip end 328 formed at an outlet of compressor 320. Axial tip end 324 may extend in a radial direction along radial length 326. Radial tip end 328 may have an axial length 330 that is less than length 326. A radial height 332 of compressor 320 or blade 322 may correspond to a distance between shaft 360 and radial tip end 328. Compressor 320 may also include one or more splitter blades (not shown) that are generally smaller than blade 322.

In some embodiments, turbocharger 310 may be a VGT. When turbocharger 310 is a VGT, a plurality of VGT vanes 370 may be arranged in a ring around an axis of rotation of turbine 340. Each vane 370 may narrow to a distal tip 372 at a radially-inward end of vane 370. Vanes 370 may be rotatable (pivotable) so as to increase or decrease an area of flow for exhaust gas entering turbine 340. Thus, by rotating vanes 370 about a an axis that extends approximately parallel to an axial direction of turbocharger 310, an amount of restriction of turbine 304 may be increased or decreased, allowing a corresponding change in the amount of pressure drop and backpressure of turbine 340. Vanes 370 may be rotatable as a group, the rotation of vanes 370 being controlled by a control unit. Turbochargers 30 and 130 may, in at least some embodiments, be configured as VGTs.

Turbine blade 342 may include an axial tip end 344 and a radial tip end 348, similar to compressor blade 322. Tip ends 344 and 348 may define a radial length 346 at an outlet of turbine 340 and an axial length 350 at an inlet of turbine 340, respectively. The radial height of turbine 340 (or turbine blade 342) may define a distance 352 from shaft 360 to radial tip end 348.

A flow area defined by compressor blades 322 may be larger than a flow area defined by turbine blades 342. The flow area of blades 322 and 342 may be established by distances 326, 330, 346, and 350. As can be seen in FIG. 3, distances 326 and 330 are each larger than distances 346 and 350. An area of the inlet of compressor 320, which corresponds to distance 326, may be larger than the area of the inlet of turbine 340, which may correspond to distance 350. Furthermore, distance 326 at the inlet of compressor 320 may be larger than distance 330 at the outlet of compressor 320, while distance 350 at the inlet of turbine 340 may be smaller than distance 346 at the outlet of turbine 340.

With continued reference to FIG. 3, a radial height 332 of turbine blade 322, and may be smaller than a radial height 352 of turbine blade 342. In one aspect, radial height 332 may correspond to a radial height of turbine 320, while radial height 352 may correspond to a radial height of turbine 340. The height 332 of compressor 320 may provide compressor 320 with a relatively low pressure ratio and a relative low compression ratio. As height 352 may be high (e.g., larger than height 332), the expansion ratio of exhaust gas as measured between the inlet at end 348 to the outlet at end 344 may be relatively high.

INDUSTRIAL APPLICABILITY

The disclosed aspects of engine system 12 and engine system 112 may be employed in a variety of machines, including stationary machines and mobile machines. For example, engine systems 12, 112 may be employed in stationary machines for electrical power creation, such as generators. However, engine systems 12 and 112 may be employed in any power system to improve efficiency.

Figure 4:
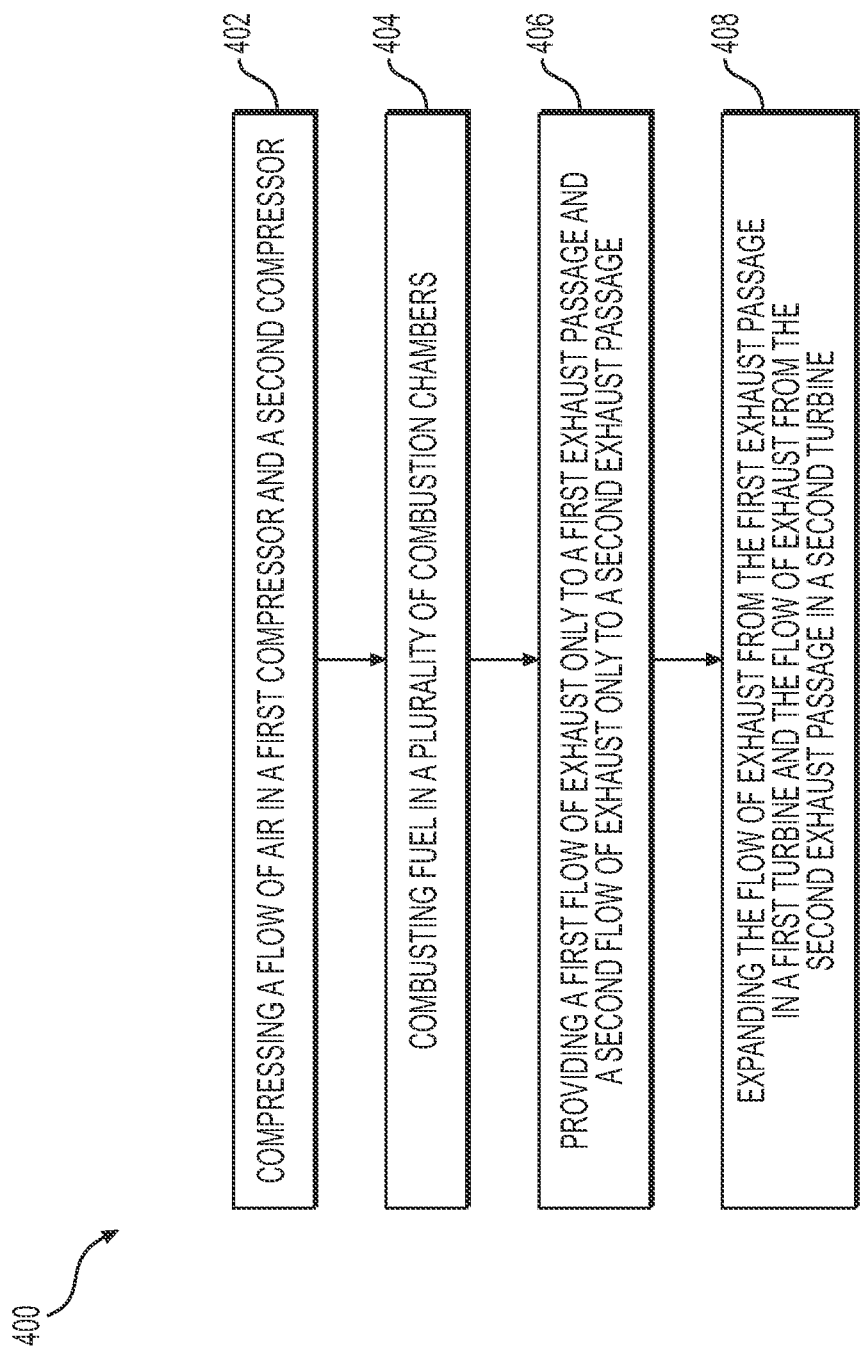
FIG. 4 is a flowchart illustrating a method according to aspects of the present disclosure.

FIG. 4 provides a flowchart illustrating an exemplary method 400 of operating engine system 12 or 112. A first step 402 of method 400 may include compressing a flow of air in a first compressor and a second compressor. For example, in system 12, first compressor 32 may compress ambient air which is further compressed by second compressor 42. Second turbine 44 may be smaller or otherwise more restrictive than first turbine 34 to function as a higher-pressure turbocharger. The compressed air may be provided to the first and second sets of combustion chambers 26 and 28 via high-pressure air passage 84 and throttle valve 90. Step 402 may also be performed by turbochargers 130, 140 of system 112.

In step 404, compressed air may be mixed with fuel in each combustion chamber of sets 26 and 28, and is combusted (e.g., by compression) to provide power to engine 14. The combustion of fuel and compressed air may produce exhaust, which exits each combustion chamber of sets 26, 28 via an exhaust valve (not shown).

In step 406, a first flow of exhaust gas may be provided from the first set of combustion chambers 26 to first exhaust passage 22. This first flow of exhaust may then pass to an inlet of turbine 34 of lower-pressure turbocharger 30. A second flow of exhaust gas from the second set of combustion chambers 28 may follow a separate path through second exhaust passage 24. A portion of this second exhaust flow may pass through EGR passage 72 and EGR passage 70 to high-pressure air passage 84. The amount of EGR gas passing through EGR passage 72 may be controlled by the state (degree of opening) of EGR valve 70. Additional control may be provided by forming second turbine 44 as a VGT. Step 406 may also be performed in system 114. For example, a first exhaust flow may pass from the combustion chambers 126 to first exhaust passage 122. A second flow of exhaust may pass from fuel cell 160 to a second exhaust passage 164.

Step 408 may include expanding the separate flows of exhaust in turbines 34, 44. For example, the first flow of exhaust may pass from first exhaust passage 22 to first turbine 34 that expands the flow of exhaust. The second flow of exhaust may pass from second exhaust passage 24 for expansion in second turbine 44. In system 114, the first flow of exhaust may include all of the exhaust from the combustion chambers 126, which is expanded in turbine 144. The second flow of exhaust in system 114 may be the exhaust (compressed air or fuel gas) received by turbine 34 via second exhaust passage 164.

The disclosed systems and method may improve efficiency of combustion systems having a plurality of exhaust flows. The ability to provide a turbocharger with a higher restriction as compared to another turbocharger may facilitate operation of an EGR system or a fuel cell system, further improving efficiency of the system. Such systems may provide greater efficiency as compared to systems in which turbines are arranged in series, systems in which a single turbine has plural inlets, and/or systems in which identical turbochargers are used. For example, by providing turbochargers having different sizes, it may be possible to provide turbochargers that waste less energy. Additionally, the disclosed systems and method may include a plurality of turbochargers in which the compressor may have a relatively high flow and low pressure ratio, while the turbine may have a relatively low flow and high expansion ratio to facilitate an asymmetric arrangement of turbochargers. The absence of a passage that acts as a bridge across exhaust streams may allow for adjustment of back pressure on one exhaust stream without affecting the other exhaust stream. When a fuel cell is included, two separate streams of exhaust gas that have different temperatures and pressures may be provided. Additional efficiency may be achieved by keeping these two streams separate. Additionally, a VGT provided as a high-pressure turbocharger may facilitate operation of an EGR system and provide greater control over a flow of exhaust gas to the EGR system. A turbine driven by depleted fuel may even further improve efficiency, as well as control over a flow of fuel gas through an anode side of the fuel cell.

It will be apparent to those skilled in the art that various modifications and variations can be made to the disclosed system and method including series-parallel turbochargers without departing from the scope of the disclosure. Other embodiments of the system and method including series-parallel turbochargers will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An engine system, comprising:
an internal combustion engine having an engine intake passage and a first exhaust passage;
a fuel cell system having a fuel cell air intake passage and a second exhaust passage;
a first turbocharger including a first compressor and a first turbine, the first compressor being in fluid communication with the engine intake passage, and the first turbine being in fluid communication with the second exhaust passage;
a second turbocharger including a second compressor and a second turbine, the second compressor connected in series with the first compressor, and the second turbine being in fluid communication with the first exhaust passage; and
a third turbine configured to receive a flow of fuel from the fuel cell system,
the first and second turbines being connected in parallel such that the first turbine only receives exhaust flow from the fuel cell system, and the second turbine only receives exhaust flow from the internal combustion engine.

2. The engine system of claim 1, further including a fuel compressor configured to compress a fuel input to the fuel cell, the fuel compressor being rotatable with the third turbine.

3. The engine system of claim 1, wherein the engine intake passage and the fuel cell air intake passage are connected downstream of the first compressor.

4. The engine system of claim 1, wherein the first turbine and the second turbine are sized differently.

5. The engine system of claim 1, wherein the fuel cell is a solid oxide fuel cell.

6. The engine system of claim 1, further including a depleted fuel passage configured to supply depleted fuel from the fuel cell system to the internal combustion engine.

7. The engine system of claim 6, wherein the third turbine is connected to the depleted fuel passage and connected fluidly between the fuel cell and the internal combustion engine.

8. An engine system, comprising:
an internal combustion engine having an engine intake passage and a first exhaust passage;
a fuel cell system having a fuel cell air intake passage and a second exhaust passage;
a first turbocharger including a first compressor and a first turbine, the first compressor being in fluid communication with the engine intake passage, and the first turbine being in fluid communication with the second exhaust passage;
a second turbocharger including a second compressor and a second turbine, the second compressor connected in series with the first compressor, and the second turbine being in fluid communication with the first exhaust passage; and
a third turbine configured to receive a flow of fuel from a passage connecting the fuel cell system and the internal combustion engine,
the first and second turbines being connected in parallel such that the first turbine only receives exhaust flow from the fuel cell system, and the second turbine only receives exhaust flow from the internal combustion engine.

9. The engine system of claim 8, further including a fuel compressor configured to compress a fuel input to the fuel cell, the fuel compressor being connected to rotate with the third turbine.

10. The engine system of claim 8, wherein the engine intake passage and the fuel cell air intake passage are connected downstream of the first compressor.

11. The engine system of claim 8, wherein the first turbine and the second turbine are sized differently.

12. The engine system of claim 8, wherein the first turbine or the second turbine is a variable geometry turbine.

13. The engine system of claim 8, wherein the first compressor has a compressor blade with an axial tip end that has a larger radial height as compared to a radial height of an axial tip end of a turbine blade of the first turbine.

14. The engine system of claim 8, wherein the second compressor has a compressor blade with an axial tip end that has a larger radial height as compared to a radial height of an axial tip end of a turbine blade of the second turbine.

15. An engine system, comprising:
an internal combustion engine having an engine intake passage and a first exhaust passage;
a fuel cell system having a fuel cell air intake passage and a second exhaust passage;
a first turbocharger including a first compressor and a first turbine, the first compressor being in fluid communication with the engine intake passage, and the first turbine being in fluid communication with the second exhaust passage;
a second turbocharger including a second compressor and a second turbine, the second compressor connected in series with the first compressor, and the second turbine being in fluid communication with the first exhaust passage; and
a third turbine configured to receive a flow of fuel from the fuel cell system,
the first and second turbines being connected in parallel such that the first turbine receives exhaust flow from the fuel cell system, and the second turbine receives exhaust flow from the internal combustion engine.

16. The engine system of claim 15, further including a fuel compressor configured to compress a fuel input to the fuel cell, the fuel compressor being rotatable with the third turbine.

17. The engine system of claim 15, wherein the engine intake passage and the fuel cell air intake passage are connected downstream of the first compressor.

18. The engine system of claim 15, wherein the first turbine and the second turbine are sized differently.

19. The engine system of claim 15, wherein the fuel cell is configured to receive diesel, natural gas, propane, methane, or hydrogen gas as fuel.

20. The engine system of claim 19, wherein the fuel cell is a solid oxide fuel cell.

* * * * *